(12) United States Patent
Gazzola et al.

(10) Patent No.: US 8,670,669 B2
(45) Date of Patent: Mar. 11, 2014

(54) DIRECTIONLESS RECONFIGURABLE OPTICAL ADD AND DROP MESH NODE

(75) Inventors: Maurizio Gazzola, Milan (IT); Ronald Johnson, Petaluma, CA (US); Lorenzo Ghioni, Tavazzano con Villavesco (IT)

(73) Assignee: Cisco Technology, Inc., San Jose, CA (US)

( * ) Notice: Subject to any disclaimer, the term of this patent is extended or adjusted under 35 U.S.C. 154(b) by 1386 days.

(21) Appl. No.: 11/831,545

(22) Filed: Jul. 31, 2007

(65) Prior Publication Data

US 2009/0034978 A1 Feb. 5, 2009

(51) Int. Cl.
*H04J 14/02* (2006.01)
*H04J 14/00* (2006.01)

(52) U.S. Cl.
USPC ............... 398/83; 398/45; 398/48; 398/49; 398/50

(58) Field of Classification Search
USPC ............................................ 398/45–57, 83
See application file for complete search history.

(56) References Cited

U.S. PATENT DOCUMENTS

| | | | |
|---|---|---|---|
| 7,574,136 B1* | 8/2009 | Zhang | 398/79 |
| 2007/0237524 A1* | 10/2007 | Gerstel et al. | 398/83 |
| 2008/0181605 A1* | 7/2008 | Palacharla et al. | 398/50 |
| 2009/0041457 A1* | 2/2009 | Maki et al. | 398/45 |
| 2010/0027996 A1* | 2/2010 | Chung et al. | 398/49 |

* cited by examiner

*Primary Examiner* — Daniel Dobson

(57) ABSTRACT

A reconfigurable optical add/drop multiplexer (ROADM) with a multiplexer, demultiplexer, and a wavelength cross-connect unit provides directionless capabilities. The ROADM allows a signal not to be limited to a particular direction when added at an optical network node, for example. The signal can be sent to other directions of the optical network node. Furthermore, the ROADM allows the wavelengths of add and drop signals to be changed and hence is "colorless."

20 Claims, 8 Drawing Sheets

DIRECTIONLESS RECONFIGURABLE OPTICAL ADD AND DROP MESH NODE

BACKGROUND OF THE INVENTION

The present invention is generally related to mesh nodes in optical networks and, in particular, to mesh node systems with add/drop capabilities.

Current optical networks are mostly DWDM (Dense Wavelength Division Multiplexing) networks in which particular wavelengths of light define communication channels so that multiple communication channels can be carried on a single optical fiber. An ITU (International Telecommunications Union) standard specifies the particular channel wavelengths and the spacing between these channels. DWDM is based upon WDM (Wavelength Division Multiplexing), an earlier ITU standard in which a smaller number of wavelength channels are carried by an optical fiber with the channels further spaced apart. It should be noted that the term DWDM, as used herein, refers to the more inclusive sense of wavelength definition of communication channels so as to include the ITU WDM and DWDM standards, unless specifically stated otherwise.

Whether in an optical network or not, a mesh node is located at the intersection of at least three, typically four or more, network links. Hence the name, "mesh." The network links provide alternate network directions for communication signals leaving the node. A system operating at a mesh node directs the communication signals entering the node from one network direction to another direction as instructed. For example, the destination address of a signal wavelength instructs a node on the direction of these signals are to be sent.

A mesh node can also provide a location for signals to be dropped from the network or added to the network. The "drop" signals are typically intended for a client located near the node. The "add" signals are typically originated from clients near the node for transport by the network. The facility to add and drop signals is a particular problem for optical networks due to the particular nature of light.

Current DWDM mesh node systems have add and drop functions on the bi-directional links connected to a mesh node. In particular, the add function is located on the link leading away from the node and the drop function on the link leading to the node. Thus a problem arises for the add signals if the link is broken or the node on the other side of the link is defective or inoperative. There is no alternate link to reroute the add signals.

Hence there is a need for flexible mesh node systems in which add and drop signals can be rerouted. The signals are not limited to particular directions, and hence are considered "directionless."

BRIEF DESCRIPTION OF THE DRAWINGS

It should be noted that in the drawings above, elements having like features or functions in different drawings often have the same reference numerals to better aid an understanding of the present invention and its embodiments.

DETAILED DESCRIPTION OF THE INVENTION

In an overview of the present invention:

One aspect provides for a system for a mesh node connected to a plurality of directions in a DWDM network. The system has a patch panel, a plurality of direction blocks, and at least one add/drop block. The patch has a plurality of ports and optical waveguides connecting each port to other ports of the plurality of ports. Each direction block is connected to one of the plurality of patch panel ports and selectively sends wavelength signals from the port to, and sends wavelength signals to the port from one of the plurality of directions. The at least one add/drop block is connected to one of the plurality of patch panel ports and sends wavelength signals from at least one client to the another one of the plurality of patch panel ports and selectively sends wavelength signals from the another one of the plurality of patch panel ports to the at least one client. The wavelength signals sent from the at least one client to the another one of the plurality of patch panel ports comprise add signals to the mesh node and the wavelength signals selectively sent from the another one of the plurality of patch panel ports to at least one client comprise drop signals from the mesh node.

For a system for a mesh node connected to a plurality of directions in a DWDM network, the system having a patch panel and a plurality of direction blocks connected to the patch panel for sending signals from one of the plurality of directions through the patch panel to another of the plurality of directions, another aspect provides for at least one add/drop block. The add/drop block has a first optical amplifier having an output terminal and an input terminal; a demultiplexer connected between the output terminal of the first optical amplifier and the at least one client; and a wavelength-selective switch connected between the patch panel and the first optical amplifier whereby the wavelength-selective switch selects drop signals from the patch panel to the at least one client.

Still another aspect provides for a system for a mesh node connected to a plurality of directions in a DWDM network. The system has a patch panel; a plurality of first blocks connected to the patch panel only sending signals from one of the plurality of directions through the patch panel to another of the plurality of directions; and at least one second block connected to the patch panel only adding and dropping signals at the mesh node.

Figure 1:
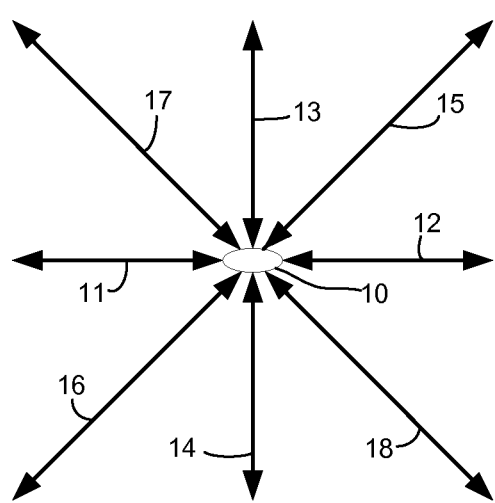
FIG. 1 is a representation of a mesh node in a network.

FIG. 1 illustrates a mesh node graphically. In an optical mesh network, the single representative node 10 in FIG. 1 is connected by optical fibers which carry optical signals to and from the node in a plurality of directions to other nodes of the network. In this example, eight directions are shown. The double-headed arrows 11-18 each represent at least two optical fibers, one optical fiber to carry signals away from the mesh node 10 to the next node connected by the optical fiber and another optical fiber to carry signals from the node connected by the optical fiber to the mesh node. In passing, it should be noted that often "degrees," rather than directions, is used to designate the capacity of the equipment or system which implements a node in a network.

Figure 2A:
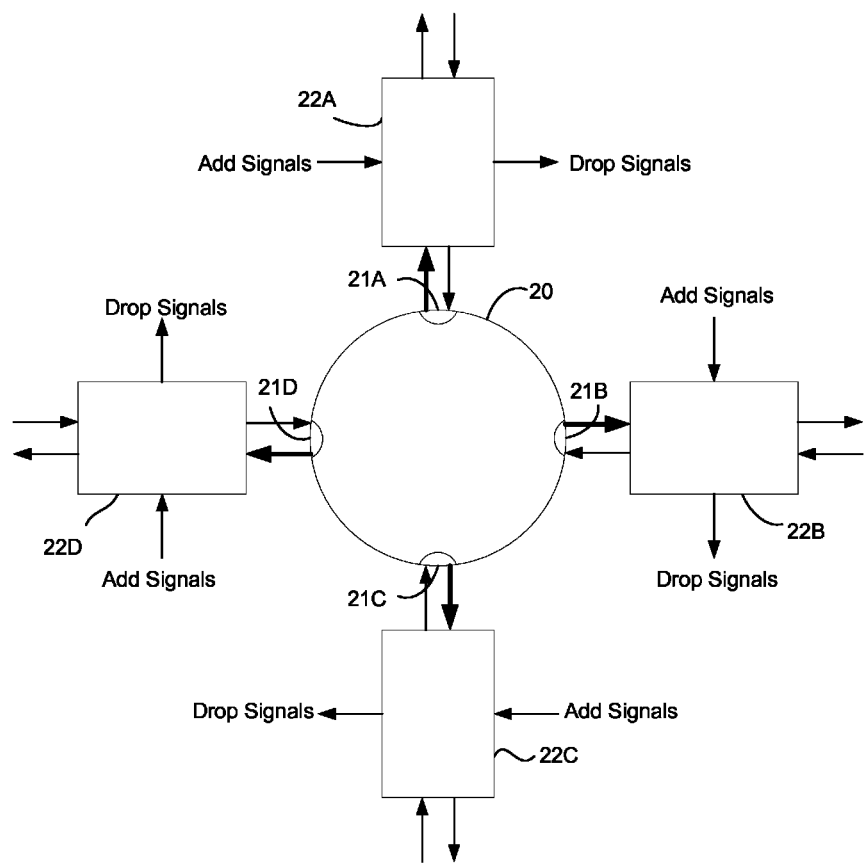
FIG. 2A illustrates the organization of a current mesh node system for a WDM network.

FIG. 2A shows the organization of a current mesh node system which implements a mesh node in a DWDM network. An example mesh node of four degrees is shown for ease of explanation. It should noted also that in a DWDM mesh node no regeneration of signals is required as the signals pass through the node from source to destination directions, in contrast to the 3R (retime, reshape and regenerate signal) operations performed at nodes in networks.

Figure 2B:
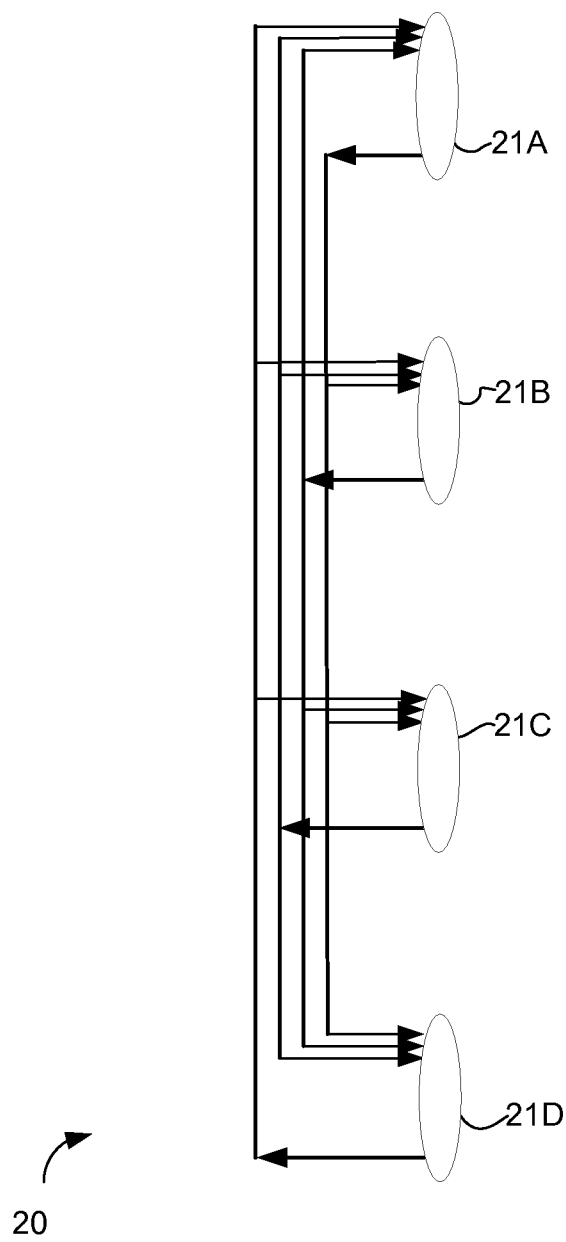
FIG. 2B shows the details of the patch panel in the FIG. 2A system.

The current system has a patch panel 20 with ports 21A-D for each of the four directions. The patch panel 20 provides paths for the optical signals entering the panel 20 through one port from one direction to the other ports in the other directions of the mesh node. FIG. 2B is a representation of the patch panel 20 which is implemented with optical waveguides, optical fibers specifically, and connectors. In the mesh node of FIG. 2A, the port 21A is connected to the other ports 21B-21D; the port 21B is connected to the other ports 21A, 21C-21D; the port 21C is connected to the other ports 21A-21B and 21D; and the port 21D is connected to the other ports 21A-21C. Of course, the multidegree patch panel 20 can easily be modified to accommodate more directions for the mesh node.

Figure 2C:
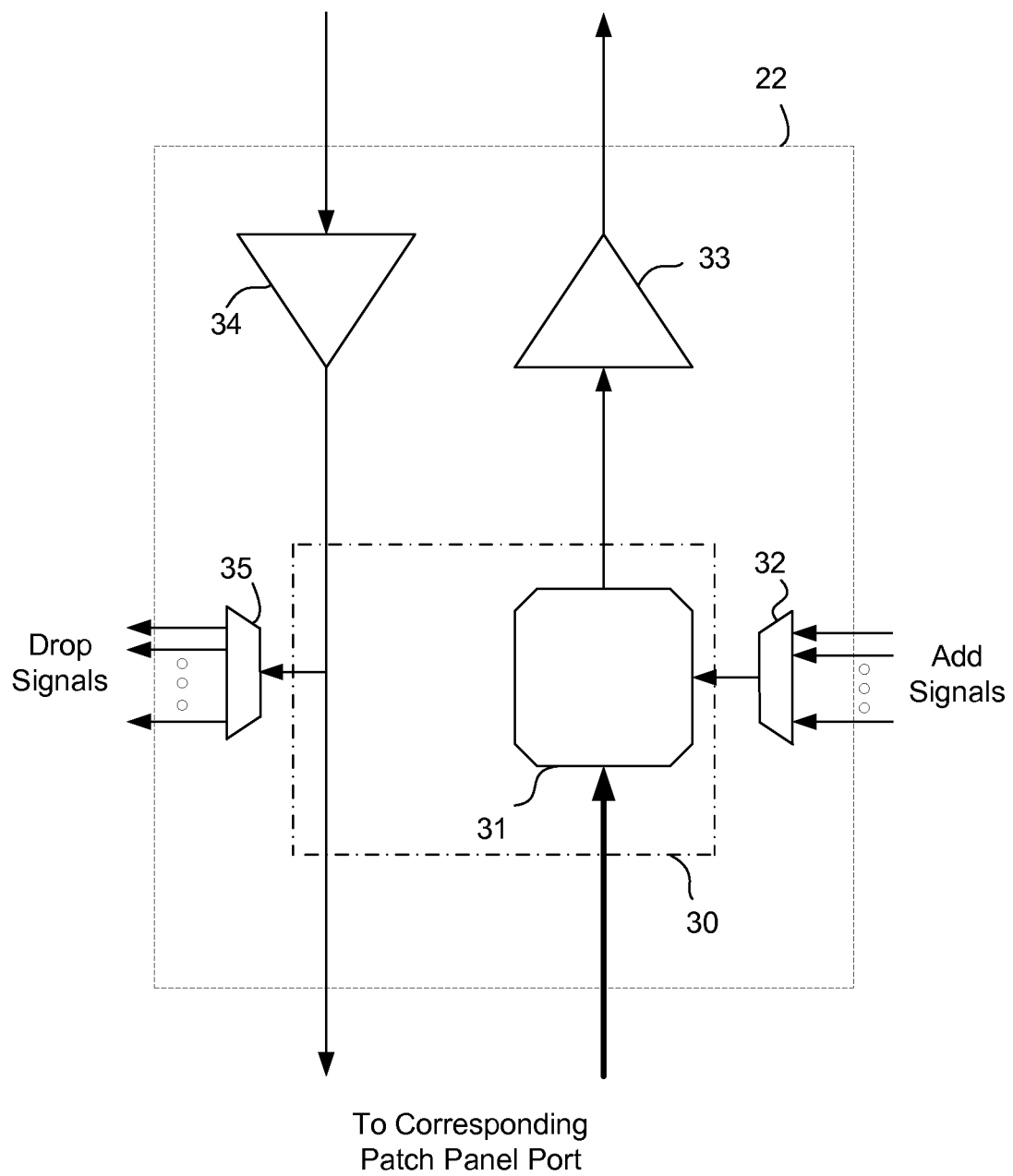
FIG. 2C shows the details of the direction block in the FIG. 2A system.

Connected to each of the patch panel ports 21A-21D is an arrangement of optical devices, represented by a block 22A-22D. The details of the blocks 22A-22D are illustrated in FIG. 2C in which an example block 22 is shown. Each block 22A-22D has an optical cross-connect device 30, two optical amplifiers 33 and 34, a multiplexer 32 and a demultiplexer 35. The optical cross-connect device 30 includes a wavelength-selective switch 31 which has multiple input terminals (as indicated by the broad arrow) connected through a single port 21 to the other patch panel ports of the patch panel 20. Another input terminal of the switch 31 is connected to an output terminal of the multiplexer 32 whose input terminals carry signals to be added at the mesh node. An output terminal of the switch 31 is connected to an input terminal of the optical amplifier 33 which, in turn, has its output terminal connected to the optical fiber leading away from the mesh node. As instructed by control signals, the wavelength-selective switch 31 selectively sends any wavelength signal combination at the switch's multiple input terminals to the common output terminal. The unselected wavelength signals are blocked from the output terminal.

The optical fiber carrying incoming signals to the mesh node is connected to an input terminal of the optical amplifier 34 whose output terminal is connected to an input terminal of the patch panel port 21. The optical cross-connect element 30 divides the amplified incoming signals and sends a fraction of the signals to the demultiplexer 35 which separates out the wavelength channel signals to be dropped.

Each direction block 22A-22D has facilities to add and drop signals for local clients. To translate the dropped optical wavelength signals to electrical signals for the client, the input terminals of a transponder device (not shown) are connected to the output terminals of the demultiplexer 35. Likewise, the output terminals of a transponder device are connected to the input terminals of the multiplexer 32 to translate the add electrical signals from the client to optical wavelength signals for network transport.

It should be noted that the FIG. 2A system requires that add signals be tied to the direction in which added signals are to travel from the mesh node and are not "directionless." A client places the add signals through the multiplexer 32 of a particular direction block 22A-22D for outgoing signals from the mesh node, i.e., for a particular link in the network. If the link for that direction is broken or the node at the other end of the link is faulty, there is no way for the add signals to be rerouted through the network to reach the intended destination node without severely disrupting the operation of the mesh node, such as rerouting the optical fibers in the patch panel 20, also termed recabling the patch panel.

Figure 3A:
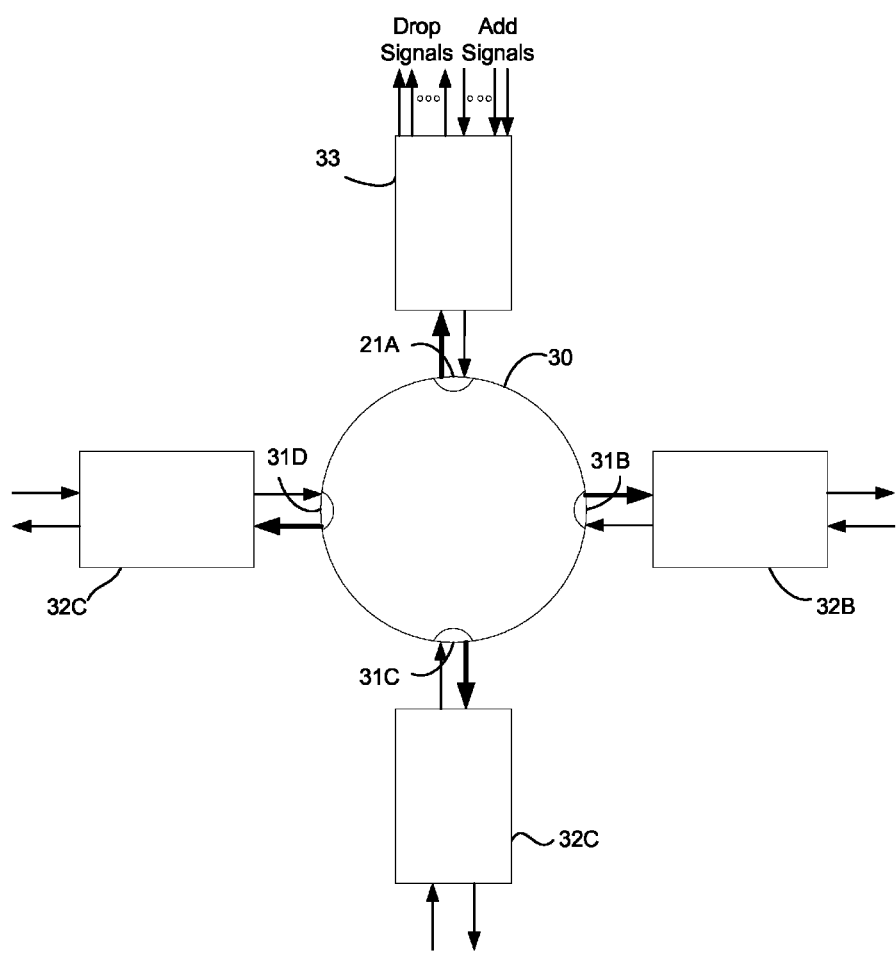
FIG. 3A illustrates the organization of a mesh node system in accordance with one embodiment of the present invention.

To ameliorate this situation, the present invention provides for an add/drop block, such as the block 33 illustrated in FIG. 3A, which allows for the add signals at the mesh node to be rerouted around a faulty link. According to one embodiment of the present invention, the add/drop block fits into any open port of a patch panel 30. The add/drop block provides a way for signals to be added and dropped at the mesh node without disrupting the mesh node system installation described previously. There is no need to reconfigure the patch panel 30 and consequently the waveguides of the panel 30 need not be optical fibers to allow recabling of the panel. The waveguides can be selected on other criteria, such as performance, costs and maintenance.

Figure 3B:
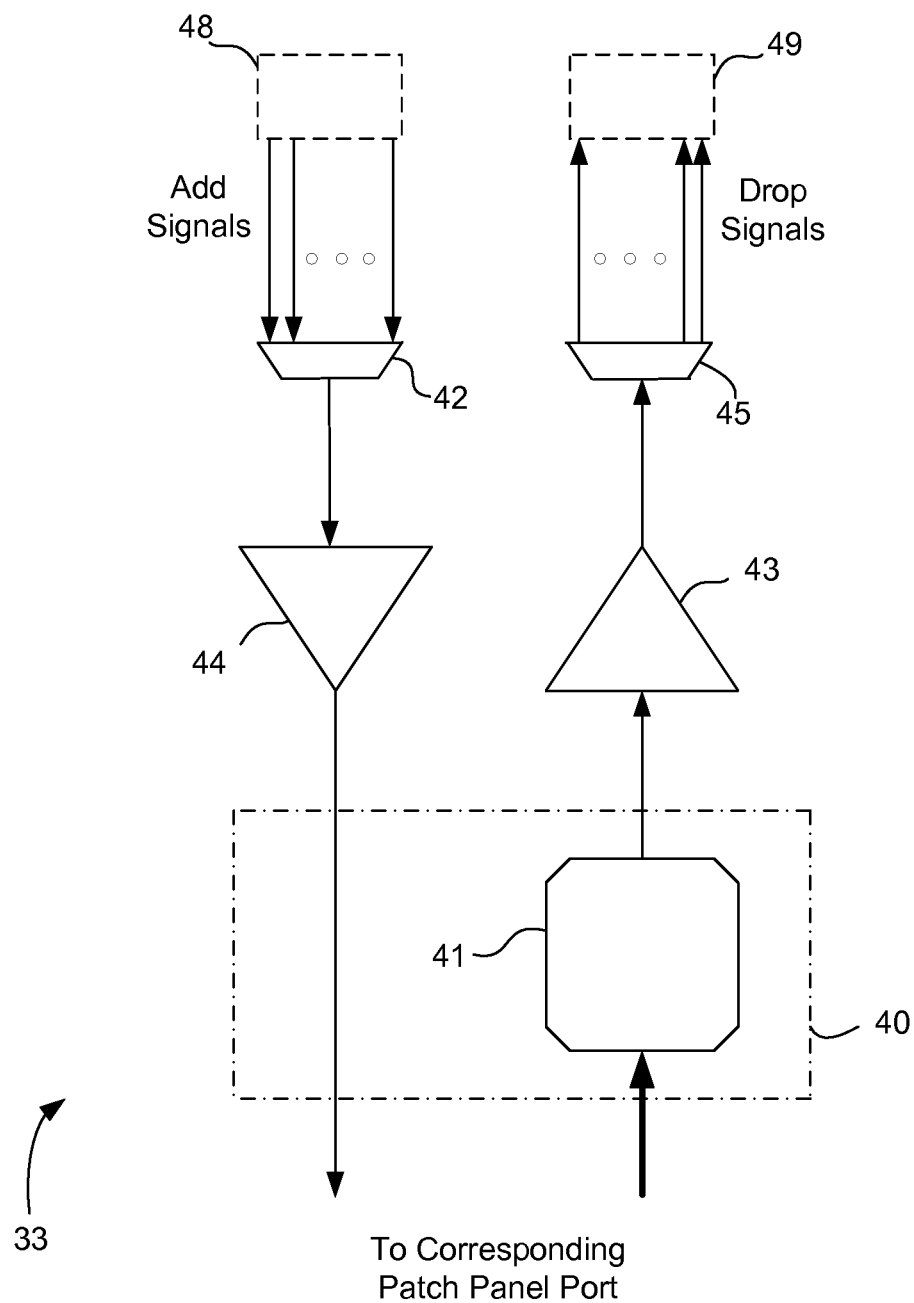
FIG. 3B illustrates the details of the add/drop block of the FIG. 3A mesh node system.

The add/drop block 33 according to one embodiment of the present invention has two optical amplifiers 43 and 44, a multiplexer 42 and a demultiplexer 45, as shown in FIG. 3B. Furthermore, the block 33 also includes an optical cross-connect device 40 with a wavelength-selective switch 41. A plurality of input terminals of the switch 41 is connected to a port of the patch panel 30 as shown by the broad arrow; the output terminal of the switch 41 is connected to the input terminal of the optical amplifier 43. The output terminal of the optical amplifier 43 is connected to the demultiplexer 45 which separates the optical signals to be dropped. The drop signals are received by clients through the input terminals of the transponder devices, here represented by the dotted box 49. Signals to be added at the mesh node from clients are generated at the output terminals of transponder devices, here represented by the dotted box 48, and received by the input terminals of the multiplexer 42 whose output terminal is connected to the input terminal of the optical amplifier 44. The output terminal of the optical amplifier 42 is connected to the patch panel port.

The result is that the add and drop signals are directionless; they are not limited to a particular direction. This is very useful. If a link to carry an add signal (or its destination node) is broken or faulty, the add signal is simply rerouted to a link in another direction to avoid the link (or node). Furthermore, if the clients connected to the multiplexer 42 and demultiplexer 45 are suitably adapted, the add and drop signals for the node become "colorless" also, i.e., the signals are not limited to particular wavelengths. Instead, the wavelength(s) for the add signals can be changed by the client and the wavelength(s) of the drop signal(s) can be selected by the wavelength-selective switch 41. Rerouting can be performed by direction and by wavelength channel.

Figure 3C:
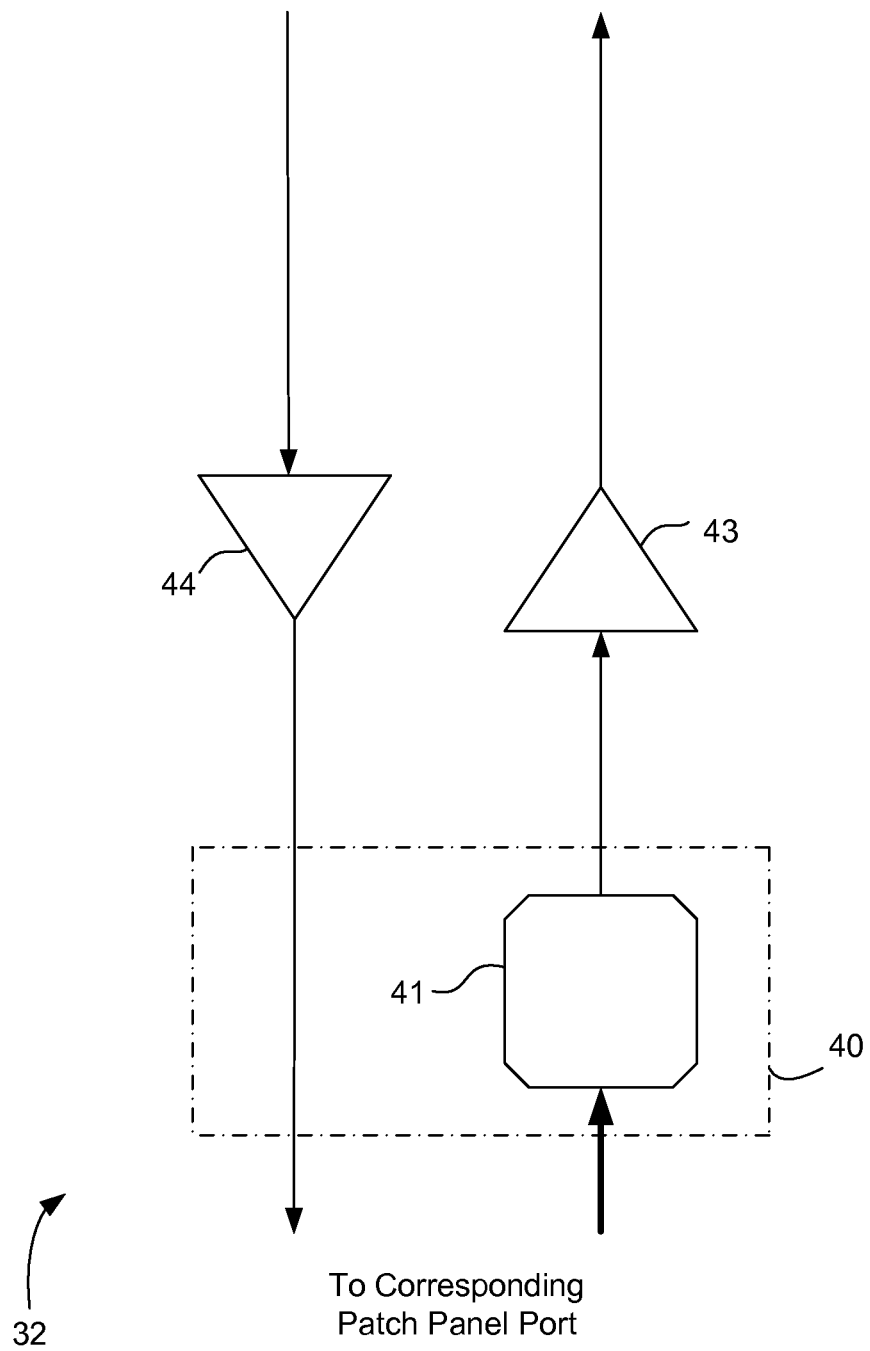
FIG. 3C illustrates the details of the direction block of the FIG. 3A system.

As shown by FIG. 3C, the direction blocks 32B-32C are simplified versions of the FIG. 2A direction blocks. The multiplexers and demultiplexers are removed since there is no need for add and drop functions.

The FIG. 3A system was drawn to illustrate the advantageous differences over the FIG. 2A system. Hence the add/drop block 33 was substituted for one of the direction block and the direction blocks 32B-32D handle the three remaining directions. To handle the four directions, a patch panel of higher degree, e.g., a patch panel of eight degrees can be used for four direction blocks 32, along with an add/drop block. If more add or drop capacity is required, a second add/drop block can be connected to the patch panel.

Figure 4:
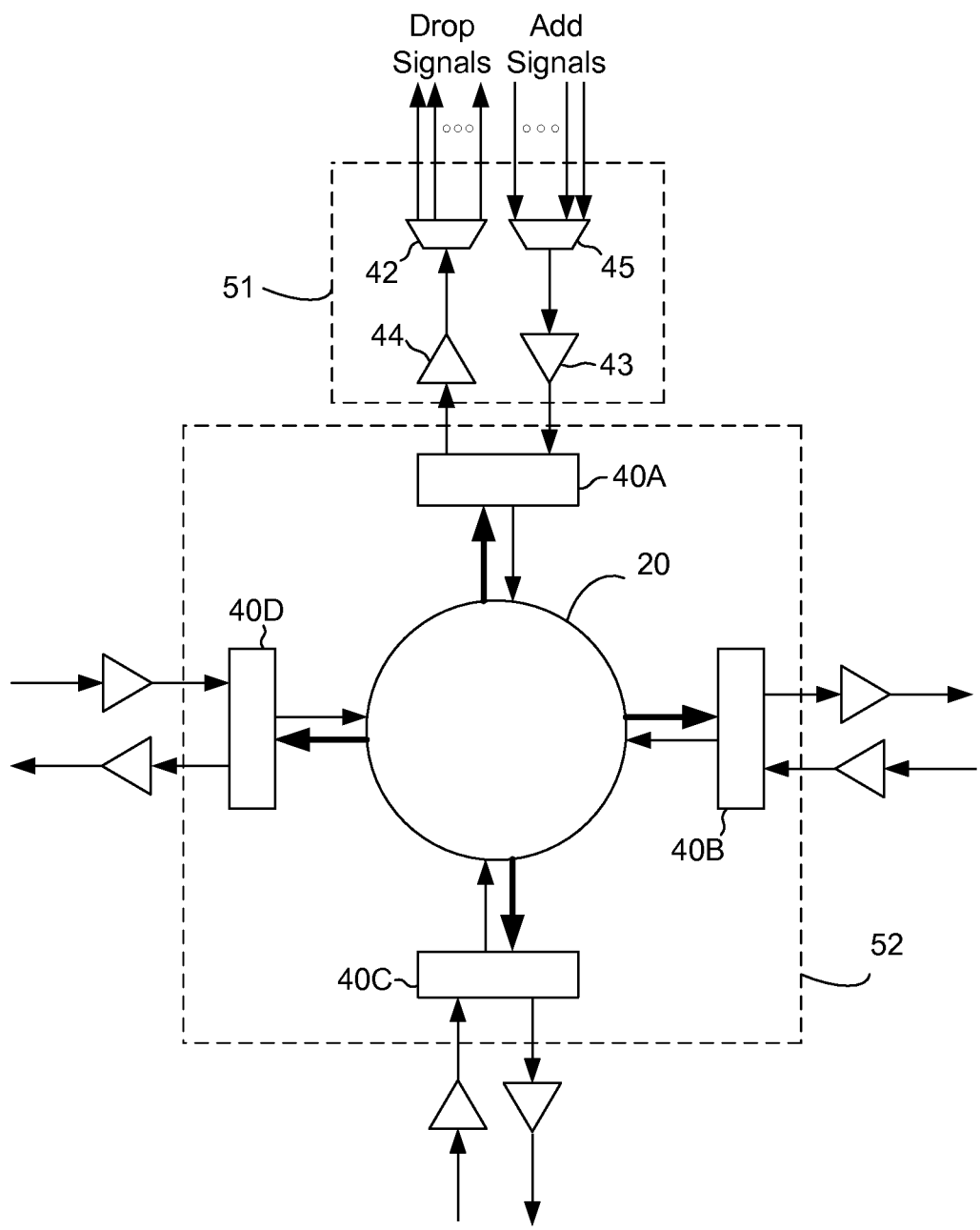
FIG. 4 shows organization of the FIG. 3A mesh node system into two network elements in accordance with an embodiment of the present invention.

As stated earlier, the blocks of FIGS. 2A and 3A are representations of an arrangement of optical devices to help explain the organization of mesh nodes. In fact, the mesh node system illustrated by FIG. 3A can be organized as a single or multiple network elements for network operations. FIG. 4 shows one organization in which a mesh node is organized into two network elements. The optical amplifiers 43, 44 and the multiplexer 45 and demultiplexer 42 are part of a network element 51, and the patch panel 20 and the optical cross-connect devices 40A-40D, are part of a second network element 52. The two network elements 51 and 52 have separate IP addresses, or node target IDs. The add wavelength signals entering the cross-connect device, 40A in the FIG. 4 example, in the second network element 52 can be sent out through the multidegree patch panel 20 and the other cross-connect devices 40B-40D in the network element 52 in any desired outbound direction selectively through software configuration.

In accordance with the present invention, the add signals are not limited to any direction, and hence are "directionless," and the paths of signals through the mesh node can be reconfigured. Likewise, in the inbound direction to the mesh node, any wavelength signals entering the second network element 52 through a cross-connect device 40B-40D and the multidegree patch panel 30 can be selectively routed to the cross-connect device 40A facing the first network element 51 for dropping. And, as mentioned earlier, the mesh node can be "colorless," which permits the wavelengths of the add and drop signals to be changed. The mesh node system can be scaled upwards easily by this flexibility.

Network control of the mesh node is communicated with conventional network communications pathways. For example, DCN (Data Communications Network) extensions can be used for provisioning, or reprovisioning upon a break in a network link, the mesh node. In an embodiment with network elements 51 and 52, the switching functions of the network node proper, i.e., network element 52, are separated from add and drop functions performed by network element 51. All the transponder, multiplexer, and demultiplexer devices, mounted in cards are advantageously located in a single network element, which then communicates with a second mesh network element containing only cross-connect devices and a multidegree patch panel. A network element is dedicated to send and receive wavelength signals to and from any desired direction of the mesh node. In addition, the wavelength signals and the direction in which they leave the node are reconfigurable through software and require no manual recabling of the patch panel.

A further advantage is the reduction in optical element count. Since an add/drop block handles the add/drop functions for all directions of the mesh node, there is no need for the add signal multiplexers and drop signal multiplexers for the direction blocks, as shown by blocks 32B-32D, and the corresponding client transponders for translating signals between the electrical and optical domains are eliminated for each direction. Devices, such as transponders, multiplexers and demultiplexers, are expensive. The costs of a mesh node system are lowered and the organization of a mesh node is simplified.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
 a patch panel having a plurality of ports that are connected to each other and that are configured to receive a plurality of optical signals and to provide a signal path for the optical signals to allow the optical signals to travel from a first of the plurality of ports to a second of the plurality of ports;
 at least one add/drop block connected to a first particular patch panel port, wherein the add/drop block is configured to:
  add electrical signals that are received from one or more clients of the system;
  translate the added electrical signals to a first plurality of wavelength signals for transport to the first particular patch panel port;
  send the translated added signals to the first particular patch panel port when a network link is broken such that the translated added signals are not limited to a particular direction or a particular wavelength;
  drop a second plurality wavelength signals from the system that are received from the first particular patch port;
  translate the dropped wavelength signals to electrical signals to be transported to the one or more clients; and
  send the translated dropped signals to the one or more clients of the system such that the translated dropped signals are not limited to a particular direction or a particular wavelength; and
 a plurality of direction blocks connected to the plurality of ports, wherein each of the direction blocks are configured to receive the first and second plurality of wavelength signals from ports of other direction blocks and the add/drop block, and wherein each of the direction blocks are configured to send the first and second plurality of wavelength signals in a plurality of directions from the plurality of ports.

2. The system of claim 1, wherein the add/drop block comprises a multiplexer device and a demultiplexer device.

3. The system of claim 2, further comprising an optical cross-connect element configured to divide the optical signals received at the plurality of ports of the patch panel and to send a portion of the optical signals to the demultiplexer device.

4. The system of claim 3, wherein the demultiplexer device is configured to separate from the optical signals the portion of the optical signals that is to be dropped from the optical signals.

5. The system of claim 1, wherein each of the plurality of direction blocks comprises:
 a first optical amplifier having a output terminal configured to send signals in one of the plurality of directions and an input terminal;
 a first wavelength-selective switch having a plurality of input terminals connected to one of the plurality of patch panel ports and an output terminal connected to the first optical amplifier input terminal, the first wavelength-selective switch selectively sending wavelength signals from the plurality of input terminals of the first wavelength-selective switch to the output terminal of the first wavelength-selective switch; and
 a second optical amplifier having an input terminal receiving signals from one of the plurality of direction blocks and an output terminal connected to one of the plurality of patch panel ports.

6. The system of claim 5, wherein the add/drop block further comprises:
 a third optical amplifier having an output terminal and an input terminal;
 a demultiplexer connected between the output terminal of the first optical amplifier and the at least one client; and a second wavelength-selective switch connected between the first particular patch panel port and the third optical amplifier.

7. The system of claim 6, wherein the add/drop block further comprises:
a fourth optical amplifier having an input terminal and an output terminal connected to the first particular patch panel port; and
a multiplexer connected between the input terminal of the fourth optical amplifier and the at least one client.

8. The system of claim 6, wherein the second wavelength-selective switch is configured to select drop signals from the first particular patch panel port to send to the at least one client.

9. The system of claim 1, further comprising:
a second add/drop block connected between the first particular patch panel port and a second particular patch panel port, the second add/drop block configured to send wavelength signals from at least a second client to the second particular patch panel port, configured to translate the wavelength signals to electrical signals and configured to send the electrical signals from the second particular patch panel port to the second client.

10. The system of claim 9, wherein the add/drop block is configured to send wavelength signals as add signals from the second client to the second particular patch panel port and wherein the add/drop block is configured to send the wavelength signals as electrical drop signals from the second particular patch panel port to the second client.

11. The system of claim 1, wherein the add/drop block further comprises:
a first optical amplifier having an output terminal and an input terminal;
a demultiplexer connected between the output terminal of the first optical amplifier and at least one client; and
a wavelength-selective switch connected between the first particular patch panel port and the first optical amplifier, wherein the wavelength-selective switch is configured to select signals that are dropped from the patch panel to the at least one client.

12. The system of claim 11, wherein the add/drop block further comprises:
a second optical amplifier having an input terminal and an output terminal connected to the first particular patch panel port; and
a multiplexer connected between the input terminal of the second optical amplifier and the at least one client.

13. The system of claim 1, wherein the system is configured to operate as a mesh node connected to a plurality of directions in a network, and wherein
the plurality of direction blocks comprises a plurality of first blocks connected to the patch panel, the plurality of first blocks configured to send signals from a first of a plurality of directions in a network to a second of a plurality of directions in the network through the patch panel from the plurality of ports; and
the at least one add/drop block comprises a second block connected to the patch panel, the second block configured to add and to drop optical signals at a mesh node of the network when a network link of the network is broken such that the added signals and dropped signals are not limited to a particular direction or a particular wavelength.

14. The system of claim 13, wherein the second block is provisioned by setting a wavelength-selective switch in the second block to cause the second block to select signals to drop from the patch panel at the mesh node and to translate the dropped signal to an electrical signal.

15. The system of claim 13, wherein the plurality of first blocks are provisioned by setting a wavelength-selective switch in each of the plurality of first blocks to cause the plurality of first blocks to select signals to send from a port of the patch panel to one of the second plurality of directions.

16. The system of claim 13, wherein the patch panel comprises non reconfigurable optical waveguides.

17. The system of claim 13, wherein the second block comprises multiplexer and demultiplexer devices.

18. The system of claim 1, wherein the add/drop block comprises an optical cross-connect element configured to send wavelength signals when a network link is broken from the at least one client to one of the plurality of patch panel ports.

19. The system of claim 1, wherein the add/drop block is configured to send wavelength signals as add signals from the at least one client to one of the plurality of patch panel ports and wherein the add/drop block is configured to send wavelength signals as drop signals from the at least one of the plurality of patch ports to the at least one client.

20. The system of claim 1, wherein the add/drop block is configured to send wavelength signals when the network link is broken by rerouting the wavelength signals from the at least one client to the one of the plurality of patch panel ports and configured to send wavelength signals when the network link is broken by rerouting the wavelength signals from the one of the plurality of patch panel ports to the at least one client.

* * * * *

UNITED STATES PATENT AND TRADEMARK OFFICE
CERTIFICATE OF CORRECTION

| | | |
|---|---|---|
| PATENT NO. | : 8,670,669 B2 | Page 1 of 1 |
| APPLICATION NO. | : 11/831545 | |
| DATED | : March 11, 2014 | |
| INVENTOR(S) | : Gazzola et al. | |

It is certified that error appears in the above-identified patent and that said Letters Patent is hereby corrected as shown below:

In the Claims

Claim 1, Column 6, Line 16, insert the word --of-- between "plurality" and "wavelength".

Signed and Sealed this
Twenty-fourth Day of June, 2014

Michelle K. Lee
*Deputy Director of the United States Patent and Trademark Office*